(12) United States Patent
Modro et al.

(10) Patent No.: US 6,945,272 B2
(45) Date of Patent: Sep. 20, 2005

(54) PASSIVELY ACTUATED VALVE

(75) Inventors: S. Michael Modro, Idaho Falls, ID (US); Abderrafi M. Ougouag, Idaho Falls, ID (US)

(73) Assignee: Battelle Energy Alliance, LLC, Idaho Falls, ID (US)

( * ) Notice: Subject to any disclaimer, the term of this patent is extended or adjusted under 35 U.S.C. 154(b) by 43 days.

(21) Appl. No.: 10/456,236

(22) Filed: Jun. 6, 2003

(65) Prior Publication Data
US 2004/0244841 A1 Dec. 9, 2004

(51) Int. Cl.[7] .......................... F16K 15/06; G21C 9/004
(52) U.S. Cl. ........................ 137/529; 137/494; 376/283
(58) Field of Search ................... 137/495, 509, 137/528, 529, 494, 843, 906; 376/283, 277; 976/DIG. 140

(56) References Cited

U.S. PATENT DOCUMENTS

| | | | |
|---|---|---|---|
| 2,574,414 A | * | 11/1951 | Ragland ..................... 137/492 |
| 3,636,969 A | | 1/1972 | Jacobellis |
| 4,363,780 A | * | 12/1982 | Hannerz ..................... 376/282 |
| 4,570,669 A | | 2/1986 | Pauliukonis |
| 5,154,876 A | | 10/1992 | Ehrke et al. |

FOREIGN PATENT DOCUMENTS

WO       WO 95/24719       *  9/1995

* cited by examiner

Primary Examiner—Ramesh Krishnamurthy
(74) Attorney, Agent, or Firm—Alan D. Kirsch

(57) ABSTRACT

A passively actuated valve for isolating a high pressure zone from a low pressure zone and discontinuing the isolation when the pressure in the high pressure zone drops below a preset threshold. If the pressure in the high pressure zone drops below the preset threshold, the valve opens and allows flow from the high pressure zone to the low pressure zone. The valve remains open allowing pressure equalization and back-flow should a pressure inversion between the two pressure zone occur.

13 Claims, 2 Drawing Sheets

PASSIVELY ACTUATED VALVE

CONTRACTUAL ORIGIN OF THE INVENTION

The United States government has rights in this invention pursuant to Contract No. DE07-AC-99ID13727.

TECHNICAL FIELD

The invention relates to a passively activated valve and more particularly to a pressure differential valve for isolating a high pressure zone from a low pressure zone and discontinuing the isolation when the pressure in the high pressure zone drops below a preset threshold.

BACKGROUND OF THE INVENTION

Advanced nuclear reactor systems, such as the Westinghouse AP600 reactor, General Electric Small Boiling Water Reactor, and other new reactor concepts such as the Multi-Application Small Light Water Reactor (MASLWR) rely on primary system depressurization as a key safety function. Usually power operated valves or squib valves are used for this purpose. These valves have to be actuated by an electric signal which is a result of electronically processed sensor signals. These valves are not passive in their operation and are prone to failure of mechanical actuators, loss of power sources and failure of sensors and of signal processing systems. Another disadvantage of conventional valves results from the use of springs to maintain the valve in the closed position. Springs tend to fatigue after long-term compression, thereby impairing the accuracy of the valve.

BRIEF DESCRIPTION OF THE DRAWINGS

Preferred embodiments of the invention are described below with reference to the accompanying drawings, which are briefly described below.

SUMMARY OF THE INVENTION

The invention provides a passively actuated valve comprising a main valve body having a chamber, first and second coaxial openings, and a third opening, the first, second and third openings in communication with the chamber at first, second and third pressures respectively. A piston is slidingly and sealingly engaged within the chamber between the first and second coaxial openings, the piston being normally in a closed position when the first pressure is greater than the second and third pressures. When the first pressure drops below a preset value, the second pressure actuates the piston to open, such that the first housing opening is now in fluid communication with the third housing opening via the valve chamber, thereby resulting in the depressurization of the first pressure.

In another embodiment of the invention a method is provided comprising providing a valve housing having first, second and third openings in communication with a chamber defined by chamber walls within the housing. A pressurized gas or liquid is contained within the first, second and third openings. A piston slidably and sealingly engaged with the chamber walls is provide. The pressure in the second opening is preset to a level (i.e., reference pressure level) that is less than a normal operating pressure level in the first opening, thereby positioning the piston within the chamber such that the first, second and third openings are isolated from each other. The isolation of the first, second and third openings precludes fluid communications between any of the valve housing openings. Upon a decrease in the pressure at the first opening below the preset pressure at the second opening, the piston is actuated to slide to a position within the chamber that causes the first opening to then engage in fluid communication with the third opening. The piston remains in this position to allow pressure equalization and back-flow should a pressure inversion between the first and third pressures occur.

DETAILED DESCRIPTION OF THE PREFERRED EMBODIMENTS

Figure 1B:
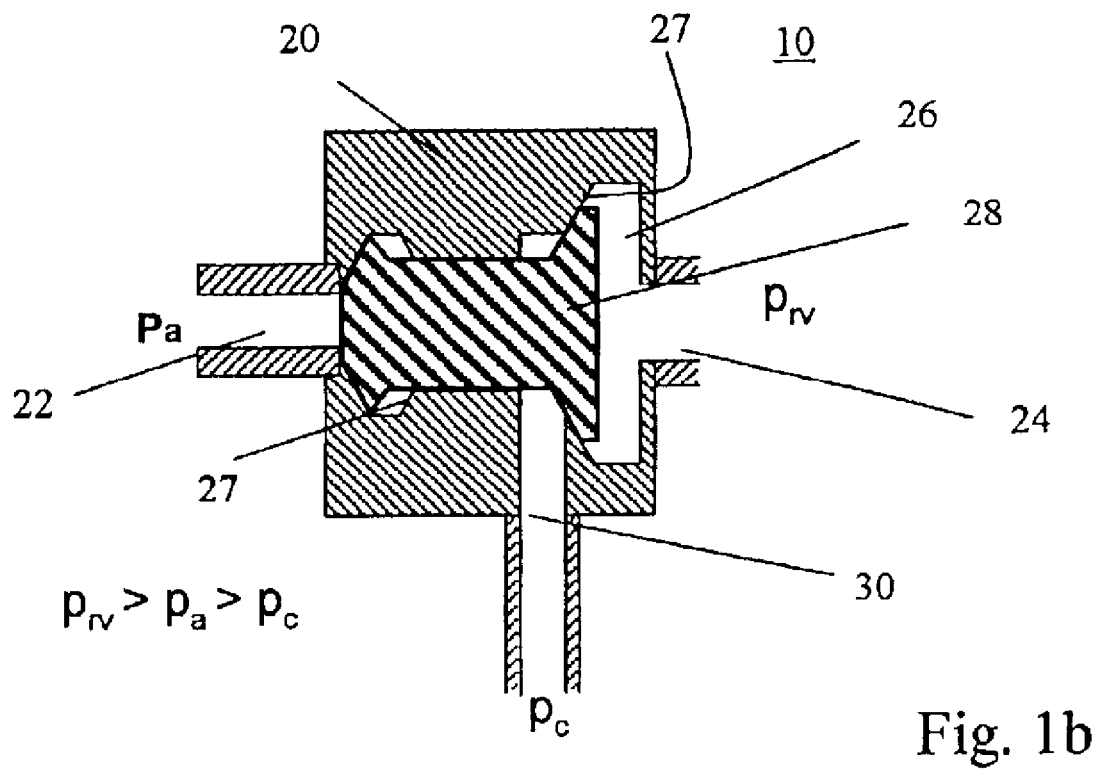
FIG. 1b is a cross-sectional view of the passively activated valve of the present position in the closed position.
Figure 1A:
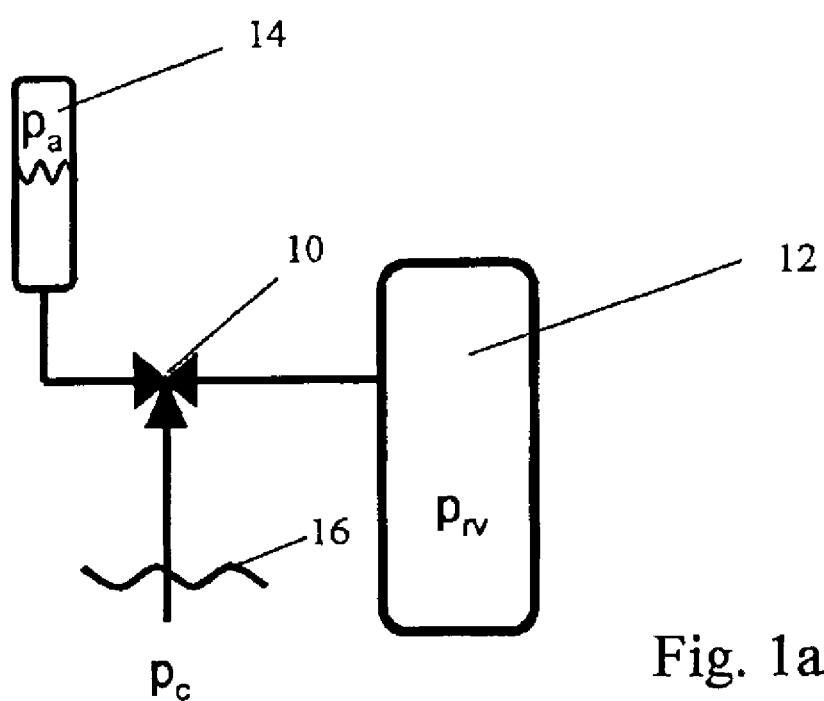
FIG. 1a is a schematic illustration of the passively activated valve of the present invention in the closed position relative to its use in a reactor system.

Referring now to FIG. 1a, a schematic illustration of the passively actuated valve is shown in a nuclear reactor application. However, it should be understood that the use of the present invention is not limited to a nuclear reactor environment. Rather, the present invention can be used in any application in which it is desired to isolate a high pressure zone from a low pressure zone and to discontinue the isolation when the pressure in the high pressure zone drops below a preset threshold.

As shown in FIG. 1a, valve 10 can be disposed between reactor vessel 12, accumulator 14 and suppression pool 16. Under normal operating conditions valve 10 is in a "closed position". As used herein, the term "closed position" is understood to mean that a high pressure zone is isolated from the low pressure zone(s). For example, referring to FIG. 1a, a high pressure zone in the reactor vessel 12 is isolated from the low pressure zones in the accumulator 14 and suppression pool 16. As will described in more detail, the isolation of the high pressure zone and the low pressure zones is achieved by means of the relative position of a piston slidably and sealingly engaged within the valve body. It should be understood that when the valve is in the closed position, independent pressures are associated with the reactor vessel 12, accumulator 14 and suppression pool 16 (designated as $P_{rv}$, $P_a$, and $P_c$ respectively in FIG. 1a).

Referring now to FIG. 1b, valve 10 is comprised of a body 20 having coaxial openings 22 and 24 at opposite ends of valve body 20. A third opening 30 in valve body 20 is also provided. Valve chamber 26 is disposed within valve body 20 and defined by chamber walls 27. Valve chamber 26 is in communication with openings 22, 24 and 30. Piston 28 is slidably and sealingly engaged with the chamber walls 27. One skilled in the art knows that there are many ways in which a piston can be sealingly engaged. For example, o-rings (not shown) could be utilized to provide the necessary seal between piston 28 and chamber walls 27 such that fluid flow is prohibited. Alternatively, chamber walls 27 and/or piston 28 could be shaped conically at the sealing surfaces and be made of, or include, a resilient material to provide the necessary seal between the piston 28 and chamber walls 27. For example, as depicted in FIG. 1b, piston 28 could have a frustoconical end and an inverse frustoconical other end, such that both ends sealingly engage corresponding portions of the chamber walls 27.

When the reactor vessel pressure (designated as $P_{rv}$) is greater than the accumulator pressure (designated as $P_a$)

which in turn is greater than the pressure in the suppression pool (designated as $P_c$), piston 28 is maintained in a closed position. These relative pressure differentials is consider a normal operating condition. This pressure difference (i.e., $P_{rv}>P_a>P_c$) ensures that the valve piston 28 is pushed against the accumulator side of the valve chamber 26, a position in which the passage of fluid (e.g. gas or liquid) between the reactor vessel and the suppression pool (via valve body opening 30) is closed. The conical surfaces provide sealing means within the valve chamber 26 thereby preventing fluid flow between the first, second and third openings when $P_{rv}>P_aP_c$.

The pressure in the accumulator ($P_a$) is preset to a pressure less than the pressure in the reactor vessel ($P_{rv}$). The accumulator pressure ($P_a$) acts as a reference pressure and is determined based on the nominal operating pressure of the reactor and typical operational pressure fluctuations, the required force to maintain the seal, and required valve dimensions, such as flow areas for a given application. Based upon plant specifications, the accumulator pressure is set by connecting to a high pressure nitrogen gas reservoir or by venting the system.

If a break in the reactor system occurs and a loss of coolant accident is initiated the reactor primary system begins to depressurize. If the break is relatively small, pressure in the reactor vessel remains high and the system depressurizes slowly, but the coolant inventory may be reduced to a level such that the nuclear core begins to heat up before emergency cooling injection is initiated. To accelerate the emergency injection, automatic depressurization systems relieve the reactor pressure. This is conventionally accomplished by a set of mechanically actuated valves, or squib valves, actuated by various signals processed by the plant safety computer.

Figure 2B:
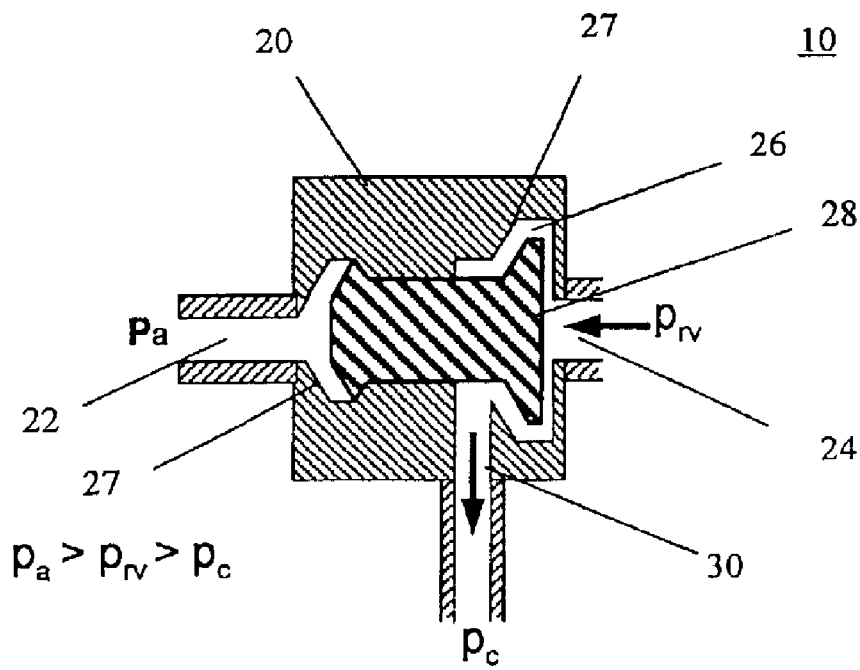
FIG. 2b. is a cross-sectional view of the passively activated valve of the present invention in the open position.
Figure 2A:
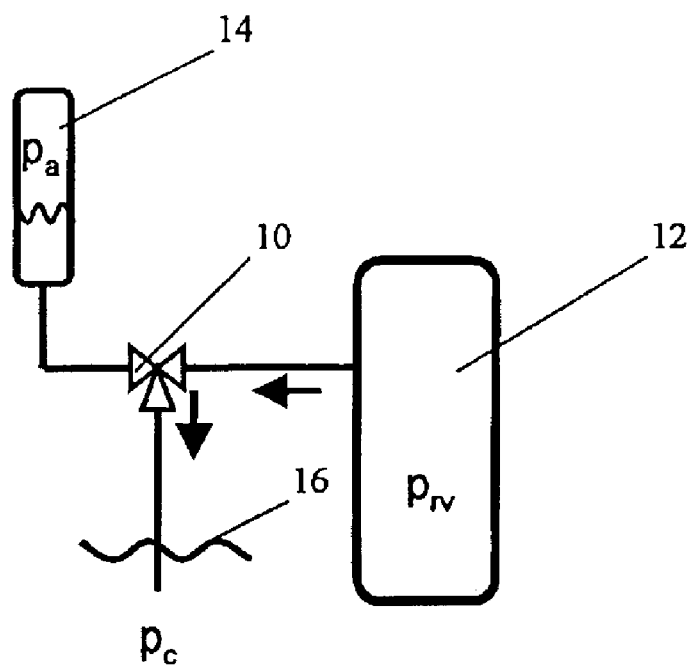
FIG. 2a. is a schematic illustration of the passively activated valve of the present invention in the open position relative to its use in a reactor system.

Referring now to FIGS. 2a and 2b, a reactor pressure decrease (due to the loss of coolant accident or other abnormal event) below the nominal reactor pressure, results in a condition at which the pressure in the accumulator 14 is higher than the pressure in the reactor vessel 12 and suppression pool 16 (i.e., $P_a>P_{rv}>P_c$). Since $P_a$ is now greater than $P_{rv}$ the pressure of $P_a$ forces the valve piston 28 to move towards the reactor vessel 12 and thus opening the depressurization passage between the reactor vessel 12 and the suppression pool 16 allowing fast depressurization of the reactor system and commencement of emergency cooling. As used herein, the term "open position" means that the piston 28 is positioned within the valve chamber 26 such that there is fluid communication between a high pressure zone and a single low pressure zone. It is also important to note that once actuated, the valve stays in the open position thereby assuring complete depressurization and activation of other plant safety functions.

Having herein set forth preferred embodiments of the present invention, it is anticipated that suitable modifications can be made thereto which will nonetheless remain within the scope of the present invention. Therefore, it is intended that the appended claims be construed to include alternative embodiments of the invention except insofar as limited by the prior art.

What is claimed is:

1. A passively actuated valve comprising:
    a main valve body having a single chamber defined by chamber walls within the valve body, and further having first and second coaxial openings, and a third opening, the first, second and third openings in communication with the chamber, the first, second and third openings containing pressurized fluid at first, second and third pressure levels respectively;
    a piston slidingly and sealingly engaged within the chamber walls between the first and second coaxial openings, the piston being in a closed position, whereby the first, second and third pressurized fluids are isolated from each other when the first fluid pressure is greater than the second and third fluid pressures, and being in an open position when the second fluid pressure is greater than the first pressure, and the first fluid pressure is greater than the third fluid pressure, so that the first pressurized fluid is released through the third valve body opening.

2. The passively actuated valve of claim 1 further comprising means for presetting the second pressure to a desired pressure level that is less than a normal operating pressure in the first opening.

3. The passively actuated valve of claim 1 wherein the piston has a frustoconical first end and an inverse frustoconical second end, both ends of sealingly engaging corresponding portions of the chamber walls.

4. The passively actuated valve of claim 1 wherein the piston is sealingly engaged with the chamber walls by o-rings.

5. The passively actuated valve of claim 1 wherein the piston comprises a resilient material, thereby providing the sealing engagement with the chamber walls.

6. The passively actuated valve of claim 1 wherein the pressure level of second pressurized fluid is set by connecting to a high pressure gas reservoir.

7. A passively actuated valve comprising:
    a main valve body having a single chamber defined by chamber walls within the valve body, and further having first, second and third openings in communication with the chamber, the first, second and third openings containing pressurized fluid at first, second and third pressure levels respectively;
    a piston slidingly and sealingly engaged within the chamber between the first and second coaxial openings;
    pressurized fluid control means for maintaining the piston in a position to isolate fluid flow between the first, second and third openings when the first fluid pressure is greater than the second and third fluid pressures, and permitting fluid flow between the first and third openings when the second fluid pressure is greater than the first fluid pressure, and the first fluid pressure is greater than the third fluid pressure.

8. The passively actuated valve of claim 7 further comprising means for presetting the second pressure to a desired pressure level less than the first pressure level under normal operating conditions.

9. The passively actuated valve of claim 7 wherein the piston has a frustoconical first end and an inverse frustoconical second end, both ends of sealingly engaging corresponding portions of the chamber walls.

10. The passively actuated valve of claim 7 wherein the piston is sealingly engaged with the chamber walls by o-rings.

11. The passively actuated valve of claim 7 wherein the piston comprises a resilient material, thereby providing the sealing engagement with the chamber walls.

12. The passively actuated valve of claim 7 wherein the pressure level of second pressurized fluid is set by connecting to a high pressure nitrogen reservoir.

13. A passive method for depressurization comprising:
    providing a valve housing having first, second and third openings in fluid communication with a single chamber defined by chamber walls disposed within the housing, the first, second and third openings each containing a pressurized fluid at first, second and third pressure levels respectively;

providing a piston slidably and sealingly engaged within the chamber walls;

presetting the second fluid pressure level less than the first fluid pressure level under normal operating conditions so that the piston is positioned within the chamber such that it isolates the three pressurized openings from each other;

actuating means responsive to a decrease in the first fluid pressure level below the preset second fluid pressure level, such that the pressurized fluid in the first opening engages in fluid communication with the third opening.

* * * * *